US012683530B2

(12) United States Patent
Agarwal

(10) Patent No.: US 12,683,530 B2
(45) Date of Patent: Jul. 14, 2026

(54) POSITION DETECTION AND MONITORING

(71) Applicant: Infineon Technologies Austria AG,
Villach (AT)

(72) Inventor: Nitin Agarwal, Torrance, CA (US)

(73) Assignee: Infineon Technologies Austria AG,
Villach (AT)

( * ) Notice: Subject to any disclaimer, the term of this
patent is extended or adjusted under 35
U.S.C. 154(b) by 275 days.

(21) Appl. No.: 18/535,513

(22) Filed: Dec. 11, 2023

(65) Prior Publication Data

US 2025/0192704 A1     Jun. 12, 2025

(51) Int. Cl.
*H02P 21/09*          (2016.01)
(52) U.S. Cl.
CPC ..................................... *H02P 21/09* (2016.02)
(58) Field of Classification Search
CPC ....... H02P 21/09; H02P 21/0089; B60L 50/51
See application file for complete search history.

(56) References Cited

U.S. PATENT DOCUMENTS

2020/0007058 A1*   1/2020   Xu ...................... H02P 21/0089
2022/0203847 A1*   6/2022   Bin ......................... B60L 50/51

* cited by examiner

*Primary Examiner* — Cortez M Cook
(74) *Attorney, Agent, or Firm* — Armis IP Law, LLC

(57) ABSTRACT

An apparatus includes a controller that controls a motor
including multiple motor windings. During operation, the
motor controller receives an error value indicating a differ-
ence between a current angular position of a rotor in the
motor with respect to a reference angular position of the
rotor. Based on the error value, the controller selects a first
angle-to-torque converter function amongst multiple angle-
to-torque converter functions in a piecewise angle-to-torque
converter function. Via the first angle-to-torque converter
function, the controller derives a torque value indicating a
magnitude of torque to apply to the rotor. The controller
applies the torque as indicated by the torque value to the
rotor.

25 Claims, 12 Drawing Sheets

700

| ELECTRICAL ANGLE RANGE | ANGLE ENDPOINTS FOR RANGE | APPLICABLE FUNCTION |
|---|---|---|
| R1 | K2 TO J2 | Y1 |
| R2 | J1 TO J4 | Y2 |
| R3 | J3 TO J6 | Y3 |
| R4 | J5 TO J8 | Y4 |
| R5 | J7 TO J9 | Y5 |
| R6 | K1 TO K4 | Y2 |
| R7 | K3 TO K6 | Y3 |
| R8 | K5 TO K8 | Y4 |
| R9 | K7 TO K9 | Y5 |

FIG. 7

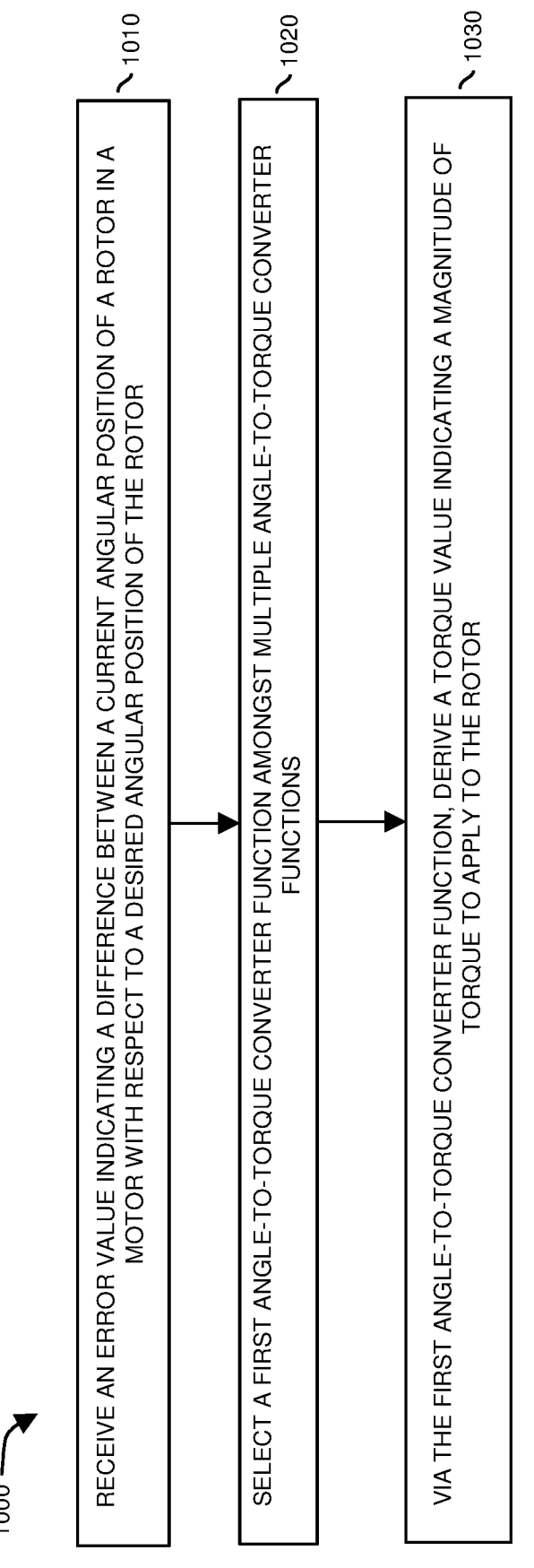

RECEIVE AN ERROR VALUE INDICATING A DIFFERENCE BETWEEN A CURRENT ANGULAR POSITION OF A ROTOR IN A MOTOR WITH RESPECT TO A DESIRED ANGULAR POSITION OF THE ROTOR

1020

SELECT A FIRST ANGLE-TO-TORQUE CONVERTER FUNCTION AMONGST MULTIPLE ANGLE-TO-TORQUE CONVERTER FUNCTIONS

1030

VIA THE FIRST ANGLE-TO-TORQUE CONVERTER FUNCTION, DERIVE A TORQUE VALUE INDICATING A MAGNITUDE OF TORQUE TO APPLY TO THE ROTOR

POSITION DETECTION AND MONITORING

BACKGROUND

For consumer, industrial, and automotive three-phase BLDC (Brushless DC Motor)/PMSM (Permanent Magnet Synchronous Motor) motor drives, customers are migrating to Field-Oriented Control (FOC) instead of the previous trapezoidal commutation control. To lower cost, a conventional GMR (Giant Magneto Resistance) angle sensor may be used to replace the costly rotary encoder to measure physical rotor position and speed. The encoder generates one index pulse every mechanical revolution and the number of the electrical revolution depends on the pole pair numbers. There is a predefined number of pulses at every mechanical revolution. The mechanical angle increments at every encoder pulse and the electrical angle can be calculated based on the number of pulses every revolution and motor pole pair. When the motor (such as controlling the wheel of a vehicle) is controlled at standstill and at an inclination (such as when the vehicle is on a hill) with zero speed, it is desirable to maintain the rotor of the motor (such as shaft) at or near the standstill position.

But due to gravity, the weight of the vehicle acts as a force on the motor shaft (rotor) and its position tends to change. For example, the rotor of the motor can be configured to control movement of a wheel associated with a vehicle. On a flat surface, there may be no outside force applied to the wheel of the vehicle. However, if the vehicle is stopped on an incline or decline, the weight of the vehicle causes the force on the wheel and causes it to move from the reference 0 position. So to maintain the motor position, a respective positive or negative torque is applied to the rotor.

BRIEF DESCRIPTION

This disclosure includes the observation that conventional techniques of controlling the position of a rotor associated with a motor suffer from deficiencies. For example, as previously discussed, it is desirable in certain cases to maintain the zero reference position of the rotor during conditions in which a corresponding outside force is applied to the rotor position causing it to move. The problem with application of the conventional control profile 110 (such as angle-to-torque function) as shown in FIG. 1 such as to apply a counteracting force on the wheel and rotor to maintain it at the 0 reference position is that it produces oscillations about the zero position along the A-B direction in graph 100 of FIG. 1 due to motor inertia. This is undesirable.

The examples as discussed herein include novel ways of improving an accuracy of maintaining a respective rotor of a motor at or near a corresponding zero reference position (such as reducing the problem of rotor oscillations in which the motor rotor rotates back and forth instead of being still were stationary) via implementation of a novel angle-to-torque function as discussed herein.

More specifically, examples herein include an apparatus and/or system including a motor controller. The motor controller can be configured to: produce an error value indicating a difference between a current angular position of a rotor in a motor with respect to a reference angular position of the rotor; based on the error value, select a first angle-to-torque converter function amongst multiple angle-to-torque converter functions; and via the first angle-to-torque converter function, derive a torque value indicating a magnitude of torque to apply to the rotor.

In one example, the motor controller may be operative to select the first angle-to-torque converter function from amongst the multiple angle-to-torque converter functions based on a magnitude of the error value.

In another example, the motor controller may be further operative to: apply the magnitude of torque to the rotor as indicated by the torque value, the torque applied in an angular direction to reduce a magnitude of the difference between the current angular position of the rotor and the reference angular position.

In accordance with further examples as discussed herein, the reference angular position may be a zero reference angular position of the rotor at a time of the motor controller executing a command to transition from rotation of the rotor to non-rotation of the rotor.

Still further, as discussed herein, each of the multiple angle-to-torque converter functions may be a linear function of angle versus torque providing a conversion of angle-to-torque.

Yet further, the multiple angle-to-torque converter functions may be a piecewise angle-to-torque converter function, the piecewise angle-to-torque converter function including the first angle-to-torque converter function and a second angle-to-torque converter function. The first angle-to-torque converter function may be assigned a first angular range; the second angle-to-torque converter function may be assigned a second angular range; and the first angular range overlaps respect to the second angular range to provide hysteresis.

In a further example, the error value may be a first error value obtained at a first instant of time; the torque value may be a first torque value; the reference angular position may be a first reference angular position; and the motor controller may be further operative to: select the first angle-to-torque converter function amongst the multiple angle-to-torque converter functions in response to detecting that the magnitude of the first error value at the first instant of time falls within a first range assigned to the first angle-to-torque converter function.

The motor controller may be further operative to receive a second error value indicating a difference between the current angular position of the rotor with respect to a second reference angular position of the rotor at a second instant of time; based on a magnitude of the second error value, select a second angle-to-torque converter function amongst the multiple angle-to-torque converter functions; and via the second angle-to-torque converter function, derive a second torque value indicating a second magnitude of torque to apply to the rotor. The motor controller may be further operative to: select the second angle-to-torque converter function amongst the multiple angle-to-torque converter functions in response to detecting that the magnitude of the second error value at the second instant of time falls within a second range assigned to the second angle-to-torque converter function. The motor controller may be further operative to: apply a magnitude of torque to the rotor as indicated by the second torque value, the torque as indicated by the second torque value applied in an angular direction to reduce a magnitude of the difference between the current angular position of the rotor at the second instant in time and the second reference angular position.

Further examples herein include one or more methods. One example method as discussed herein includes a method comprising: receiving a current angular position of a rotor in a motor with respect to a reference angular position of the rotor; based on the current angular position, selecting a first angle-to-torque converter function amongst multiple angle-to-torque converter functions; and via the first angle-totorque converter function, deriving a torque value indicating a magnitude of torque to apply to the rotor.

The method may further include applying the magnitude of torque to the rotor as indicated by the torque value, the torque applied in an angular direction to reduce a magnitude of the difference between the current angular position of the rotor and the reference angular position.

Still further, in one example, the reference angular position may be a zero reference angular position of the rotor at a time of the motor controller executing a command to transition from rotation of the motor to non-rotation of the rotor.

Each of the multiple angle-to-torque converter functions may be a linear function of angle versus torque providing a conversion of angle-to-torque. A piecewise combination of the multiple angle-to-torque converter functions may represent a nonlinear angle-to-torque converter function.

Still further, another example as discussed herein includes: producing multiple angle-to-torque converter functions; selecting portions of the multiple angle-to-torque converter functions; and deriving a piecewise angle-to-torque converter function based on the selected portions of the multiple angle-to-torque converter functions. The piecewise angle-to-torque converter function can be configured to approximate a nonlinear angle-to-torque converter function. If desired, each of the multiple angle-to-torque converter functions may be a linear function.

Yet further, in another example, the selected portions of the multiple angle-to-torque converter functions include: a first portion, the first portion selected from a first angle-to-torque function of the multiple angle-to-torque functions; and a second portion, the second portion selected from a second angle-to-torque function of the multiple angle-to-torque function.

Deriving the piecewise angle-to-torque converter function may include: assigning a first angular range to the first portion; and signing a second angular range to the second portion. The first angular range may partially overlap with respect to the second angular range to provide hysteresis.

As previously discussed, examples herein are useful over conventional techniques. For example, implementation of the piecewise angle-to-torque converter function provides better control of a respective motor and reduces unwanted oscillation associated with the rotor of the motor.

These and other more specific examples are disclosed in more detail below.

Note that although examples as discussed herein are applicable to motor control, the concepts disclosed herein may be advantageously applied in any suitable application.

Note further that any of the resources as discussed herein can include one or more computerized devices, control devices, motor controllers, vehicle controllers, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different examples as described herein.

Yet other examples herein include software programs to perform the steps and operations summarized above and disclosed in detail below. One such example comprises a computer program product including a non-transitory computer-readable storage medium or any computer readable hardware storage medium or media on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, examples herein are directed to methods, systems, computer program products, etc., that support operations as discussed herein.

One example herein includes computer readable storage hardware having instructions stored thereon. The instructions, when executed by computer processor hardware, cause the computer processor hardware (such as one or more co-located or disparately located processor devices) to: receive an error value indicating a difference between a current angular position of a rotor in a motor with respect to a zero reference angular position of the rotor; based on the error value for the current angular position of the rotor, select a first angle-to-torque converter function amongst multiple angle-to-torque converter functions; and via the first angle-to-torque converter function, derive a torque value indicating a magnitude of torque to apply to the rotor based on the error value.

Another example herein includes a computer readable storage medium and/or system having instructions stored thereon. The instructions, when executed by computer processor hardware, cause the computer processor hardware (such as one or more co-located or disparately located processor devices) to: receive multiple angle-to-torque converter functions; select portions of the multiple angle-to-torque converter functions; and derive a piecewise angle-to-torque converter function based on the selected portions of the multiple angle-to-torque converter functions.

The ordering of the steps above has been added for clarity sake. Note that any of the processing operations as discussed herein can be performed in any suitable order.

Other examples of the present disclosure include software programs and/or respective hardware to perform any of the method example steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of detecting the position of a motor rotor. However, it should be noted that examples herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of examples herein (BRIEF DESCRIPTION OF EXAMPLES) purposefully does not specify every example and/or incrementally novel aspect of the present disclosure or claimed invention (s). Instead, this brief description only presents general examples and corresponding points of novelty over conventional techniques. For additional details and/or possible perspectives (permutations) of the invention(s), the reader is directed to the Detailed Description section (which is a summary of examples) and corresponding figures of the present disclosure as further discussed below.

BRIEF DESCRIPTION OF THE DRAWINGS

FIG. 7 is an example diagram illustrating mapping information indicating different ranges of angles associated with different functions of a piecewise angle-to-torque converter function as discussed herein.

FIG. 10 is an example diagram illustrating a method of implementing a piecewise angle-to-torque converter function as discussed herein.

Figure 1:
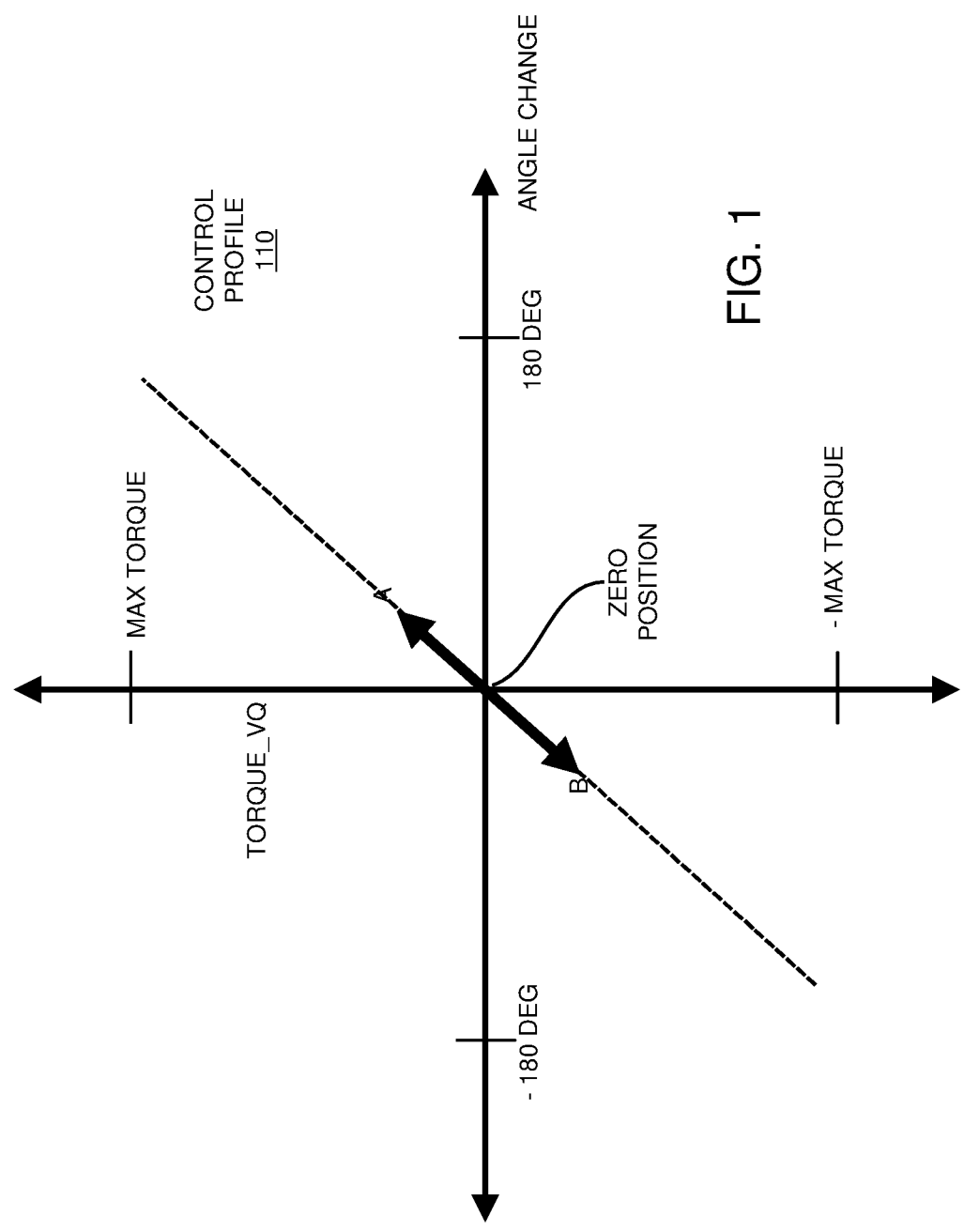
FIG. 1 is an example diagram illustrating implementation of a linear angle-to-torque function and resulting rotor position oscillations according to conventional techniques.

The foregoing and other objects, features, and advantages of the invention will be apparent from the following more particular description of preferred examples herein, as illustrated in the accompanying drawings in which like reference characters refer to the same parts throughout the different views. The drawings are not necessarily to scale, with emphasis instead being placed upon illustrating the examples, principles, concepts, etc.

DETAILED DESCRIPTION

A controller controls a rotor of a motor including multiple motor windings. The motor controller produces and/or receives an error value indicating a difference between a current angular position of a rotor in the motor with respect to a reference angular position of the rotor. The current angular position of the rotor can be determined via a position sensor. Based on the current angular position and/or the error value of the rotor, the motor controller determines a range in which the current angular position or the error value resides. The motor controller then selects a first angle-to-torque converter function associated with the determined range in which the error value falls. In one example, the first angle-to-torque converter function is one of multiple angle-to-torque converter functions in a piecewise angle-to-torque converter function. Via the selected first angle-to-torque converter function, and the current angular position of the rotor and/or error value, the controller derives a torque value indicating a magnitude of torque to apply to the rotor. The motor controller then applies the torque as specified by the torque value to the rotor to maintain the rotor at or near the reference position.

Figure 2:
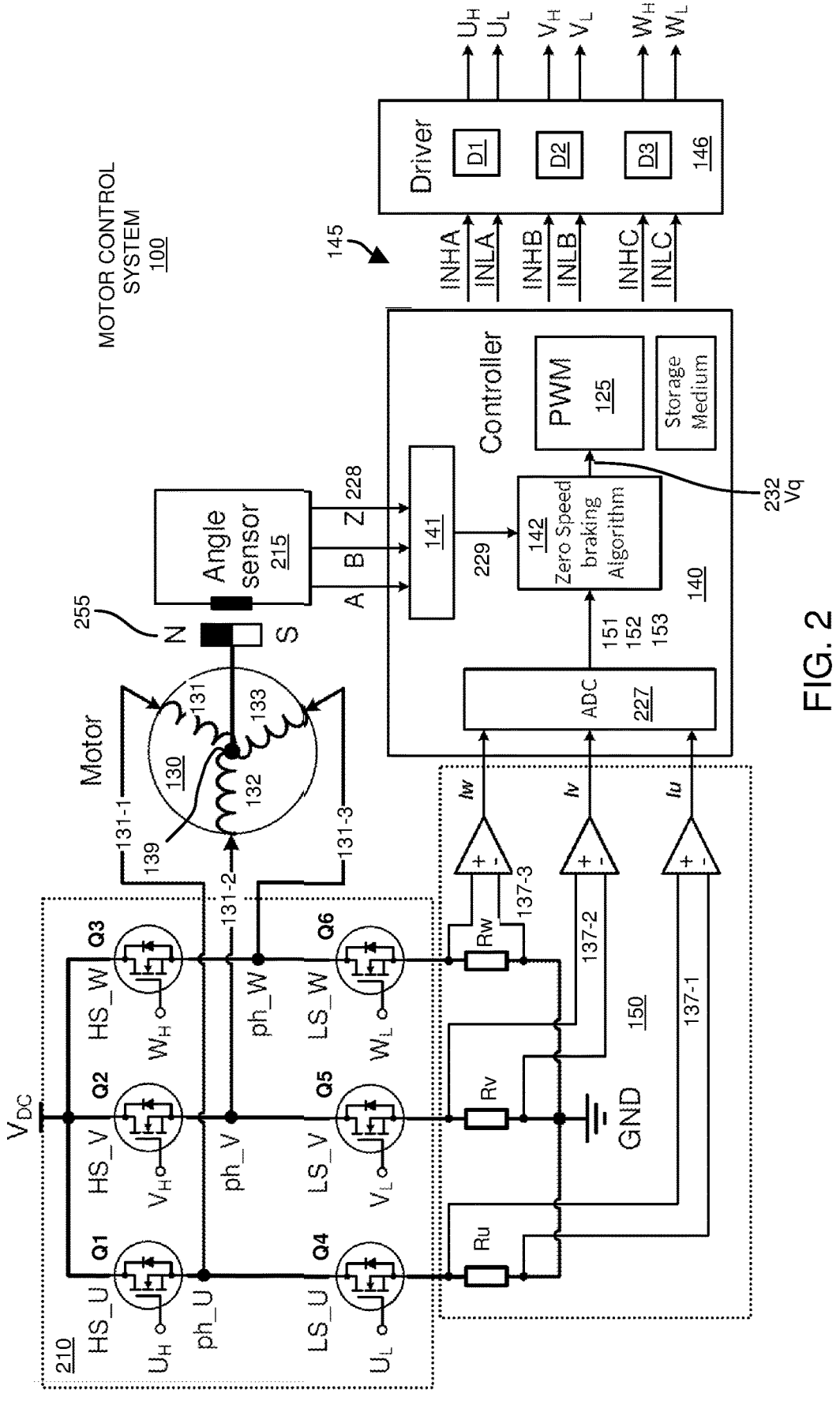
FIG. 2 is an example general diagram of a motor control system as discussed herein.

Now, more specifically, FIG. 2 is an example general diagram of a motor control system as discussed herein.

In general, FIG. 2 is an example block diagram of electronics associated with a motor control system 100. In this example, the current through the windings 131, 132, in 133 of the motor 130 is controlled by controller 140 and corresponding driver circuitry 146 and 210 such as a 3-phase inverter with MOSFET (Metal Oxide Semiconductor Field Effect Transistor), IGBT (Insulated Gate Bipolar Transistor), or GaN (Gallium Nitride) transistors as switching devices.

As further shown, analog current sensing signals of the motor phases (such as the voltage 137-1 across the resistor Ru, the voltage 137-2 across the resistor Rv, and the voltage 137-3 across the resistor Rw) are passed to the ADC (Analog-to-Digital Conversion) current monitor unit 227 of the controller 140 (such as Microcontroller Unit, MCU, microprocessor, controller hardware, etc.) for digitized control of the rotor 139. In one example, via current 131-1, 132-1, 133-1, through each of the respective windings 131, 132, 133, the motor winding current and status can be sensed by the three shunt resistors Ru, Rv, and Rw as shown, or alternatively by one shunt resistor on the dc-link bus, or Hall-effect current sensors, or any other current sensing techniques. In other words, the magnitude of the respective current through each of the windings of the motor 130 can be achieved in any number of ways.

Note further that the position interface 141 (a.k.a., angle processing resource) associated with the controller 140 receives rotor position information 228 including signals A, B, and Z supplied from the angle sensor 215 to the position interface 141. Signals A, B, and Z are encoded to indicate the corresponding current angular position of the rotor 139.

As previously discussed, the current monitor 227 such as an analog-to-digital converter unit associated with the controller 140 provides information to says signals 151, 152, and 153 to the control function 142 (such as implementing a zero speed braking algorithm).

The position interface 141 converts the received rotor position information 228 into a respective rotor position signal 229 indicating angular position or angular orientation of the rotor 139.

As further shown, the controller 140 implements the control function 142 (such as a 0 speed braking algorithm) to generate a torque value (as captured by the torque value 232 or signal Vq) in which to apply to the rotor 139 based upon the signal 229. The controller 140 outputs output PWM (Pulse-Width Modulation) control signals 145 to the gate driver circuitry 146 to control the inverter switching devices such as switches Q1 through Q6.

In one example, a magnet 255 is connected to the motor rotor 139 (such as a rotating shaft) and the magnet 255 resides near the angle sensor 215. As previously discussed, the angle sensor 215 can be configured to output signals 228 to the position interface 141 of the controller 140 for rotor angle and speed processing. The control function 142 uses the current rotor position information 229 to produce the torque value 232. Based on a magnitude of the torque value to 232, the pulse width modulation control 125 produces respective control signals 145 supplied to the drivers 146 including driver D1, driver D 2, and driver D3. The driver D1 controls operation of switches Q1 and Q4; the driver D2 controls operation of switches Q2 and Q5; and driver D3 controls operation of switches Q3 and Q 6.

As further shown, the motor 130 includes a respective rotating rotor 139 (supporting clockwise or counterclockwise rotation). The position of the rotating rotor 139 varies (e.g., the rotor rotates) in response to the controller 140 supplying sufficient drive current at the appropriate frequency through the respective windings 131, 132, and 133 of the motor 130 via the drivers D1, D2, and D3 above a threshold value.

In one example, while supplying current 131-1, 132-1, and 133-1, to the respective motor windings 131, 132, and 133, as its name suggests, the current monitor 150 monitors a magnitude of current 131-1, current 132-1, and current 133-1.

In accordance with still further examples, note that a frequency of the current supplied through the windings 131, 132, and 133 is greater than a rotational frequency of the rotor 139. In other words, a span of −180 degrees to +180 degrees (360 degrees) of signal control associated with the pulse width modulation driver 143 and drive signals 145 represents a 24 degree mechanical rotation of the rotor 139. In such an instance, in order to cause a full mechanical rotation of the rotor 139 by 360 degrees, the controller 140 applies fifteen electronic control cycles. In this example, assume that the motor 130 includes 15 electrical cycles per each mechanical cycle based upon 15 motor pole-pairs. If the number of motor pole pairs is different than 15, that number should be used here. Additional details are shown in the following FIGS. and description.

Figure 3:
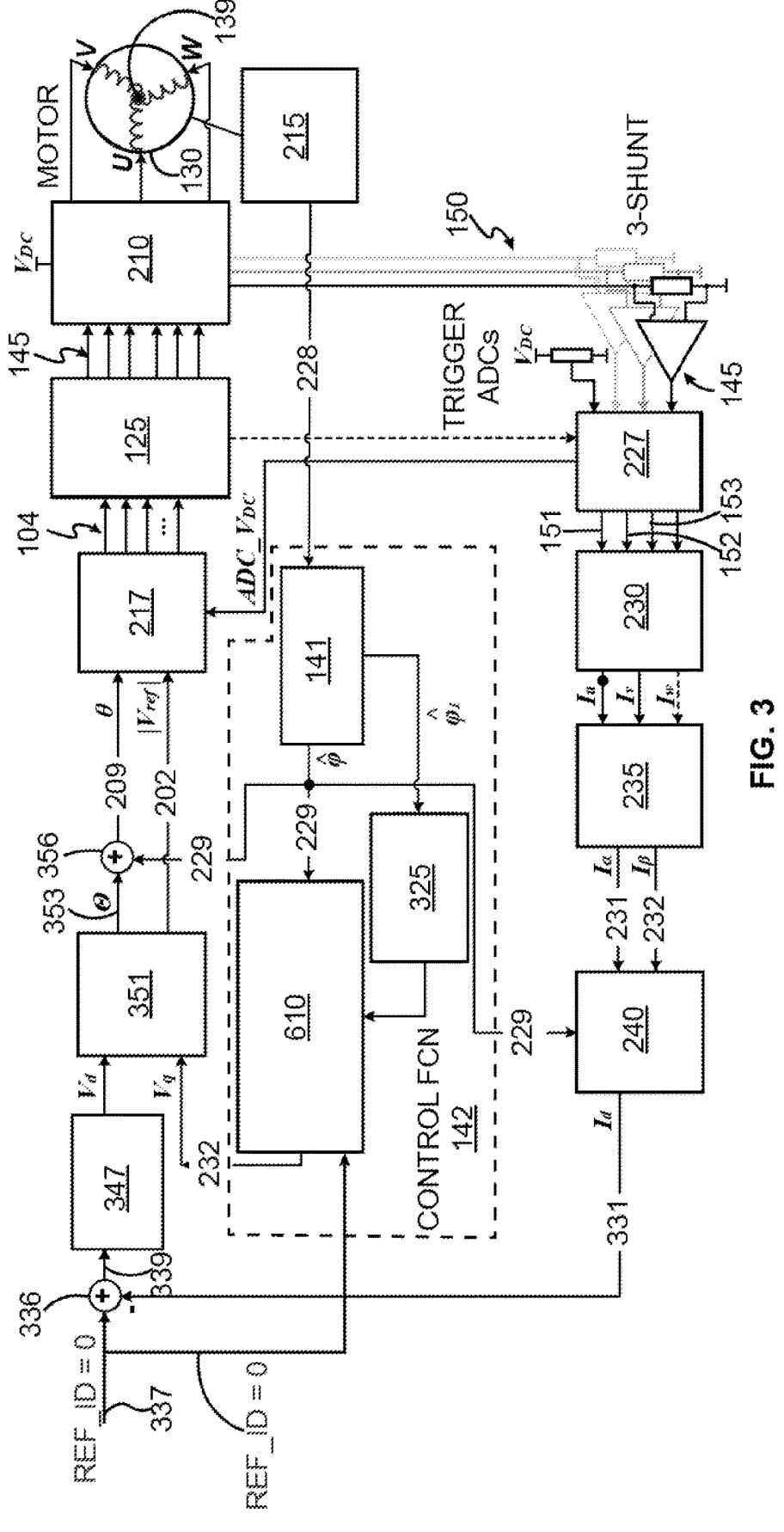
FIG. 3 is an example detailed diagram of a motor controller operative to implement novel zero-speed braking torque to a rotor in a motor as discussed herein.

FIG. 3 is an example detailed diagram of a motor controller operative to implement zero-speed braking torque to a rotor in a motor as discussed herein.

In this example, torque signal Vq is modulated based on a respective change in angle of the rotor 139 to prevent or reduce the rotor 139 from oscillating.

Examples herein include the position detection system (such as angle sensor 215) to determine rotor position associated with the rotor 139 of the motor 130. As previously discussed, by way of non-limiting example, the motor 130 can be any suitable type such as a BLDC motor, PMSM motor, etc.

In this example as shown in FIG. 3, a rotating space voltage vector (i.e., excitation voltage) is applied to the motor phases (windings) with a Space Vector Modulation (SVM) technique, and the current will flow through the motor phases (windings of motor 130), the currents of which are measured by 1, 2, or 3-shunt current sensing resistors in a manner as previously discussed. In this example, as previously discussed, the inverter 210 includes corresponding resistors RU, RV, and RW to measure respective current through each of the windings 131, 132, and 133.

Note that any technique can be used to monitor and detect the magnitude of current supplied by each of the drivers to the windings 131, 123, and 133. For example, other ways of motor phase current sensing such as using motor phase in-line shunt resistors, Hall sensors, current transducers (e.g.: LEM current sensors), and so on, can be used to sense current and determine the initial rotor position as well.

Space vector modulation module 217 receives signal 209 (Theta) and signal 202 (such as absolute value of Vref) and produces excitation signals 104 to control application of current 131-1, 132-1, and 133-1 supplied to respective windings 131, 132, 133 of the motor 130. The drive signal generator 125 uses the signals 104 to produce control signals 145 applied to driver 146, which drives the corresponding drivers D1, D2, D3 to control switches in the inverter 210.

Thus, in a similar manner as previously discussed in FIG. 2, the controller 140 produces respective control signals supplied to the driver circuitry 146 including the driver D1, driver D2, the driver D3. In accordance with the control signals 145 provided from the drive signal generator 125, the driver D1 associated with the inverter 210 controls switches Q1 and Q4 and supplies current 131-1 to winding 131; the driver D2 associated with the inverter 210 controls switches Q2 and Q5 and supplies current 132-1 to winding 132; the driver D3 associated with the inverter 210 controls switches Q3 and Q6 and supplies current 133-1 to winding 133.

As further shown in FIG. 3, current monitor 150 monitors a magnitude of the current 131-1, 132-1 and 133-1 through each of the windings 131, 132, and 133. The current monitor 150 supplies signal 151 (representing a detected magnitude of current 131-1 through winding 131), signal 152 (representing a magnitude of current 132-1 through winding 132), and signal 153 (representing a magnitude of current 133-1 through winding 133) to the module 230.

Module 230 outputs signals 151, 152 and 153 (such as Iu indicating a magnitude of current 131-1 through the winding 131, Iv indicating a magnitude of current 132-1 through the winding 132, and Iv indicating a magnitude of current 133-1 through the winding 133) to the module 235.

In one example, the module 235 applies a Clarke transform (or other suitable transform) to the received signals from the module 230 to produce the respective signal 231 and 232. Module 235 outputs the signals 231 (Ialpha) and 232 (Ibeta) to the module 240.

In one example, the module 240 applies a so-called Park transform to the received signals 231 and 232 to produce signal 331. Module 240 outputs the signal 331 to the summer 336.

The summer 336 produces signal 339 indicating a difference between the input signal 337 (such as ref_ID=0) and the signal 331. The summer 336 outputs the signal 339 to the PI controller 347. The controller 347 produces the signal Vd supplied to the module 351 (such as a Cartesian to polar transform function). Additionally, the module 351 receives signal 232 (Vq) from the control function 142.

As previously discussed, the controller 140 includes the control function 142 that implements a so-called 0 speed braking algorithm. The control function 142 includes the angle processing resource 141 and one or more buffers to store the zero angle reference value 325 and piecewise angle-to-torque converter function 610. Note that function 610 receives input signal 337 (Reference_ID=0).

During operation, the angle processing resource 141 receives the rotor position information 228 generated by the angle sensor 215. The angle processing resource 141 stores the 0 angle reference value 325 at a time when the corresponding rotor 139 of the motor 130 is controlled to a stop state.

In one example, the control function 142 produces a respective error value indicating a difference between a current angular position of the rotor as indicated by the rotor position signal 229 and the stored zero angle reference value 325 (last stop position of the rotor 139). As further discussed herein, the controller 142 applies the error value to the piecewise angle-to-torque converter function 610 to produce a corresponding signal Vq indicating a magnitude of torque to apply to the rotor 139.

The controller 142 supplies the signal Vq (232) to the module 351. As previously discussed, the signal 232 indicates supplemental torque to supply to the rotor 139.

Module 351 produces the signal 353 supplied to the summer 356. The module 351 also produces the respective signal 202 supplied to the modulator 217. Summer 356 produces signal 209 (Theta) via a summation of the signal 353 and the rotor position signal 229.

As discussed herein, the generation of the signal Vq and the implementation of the piecewise angle-to-torque converter function 610 by the control function 142 helps to maintain the position of the rotor 139 at or near the 0 reference position 325.

Figure 4:
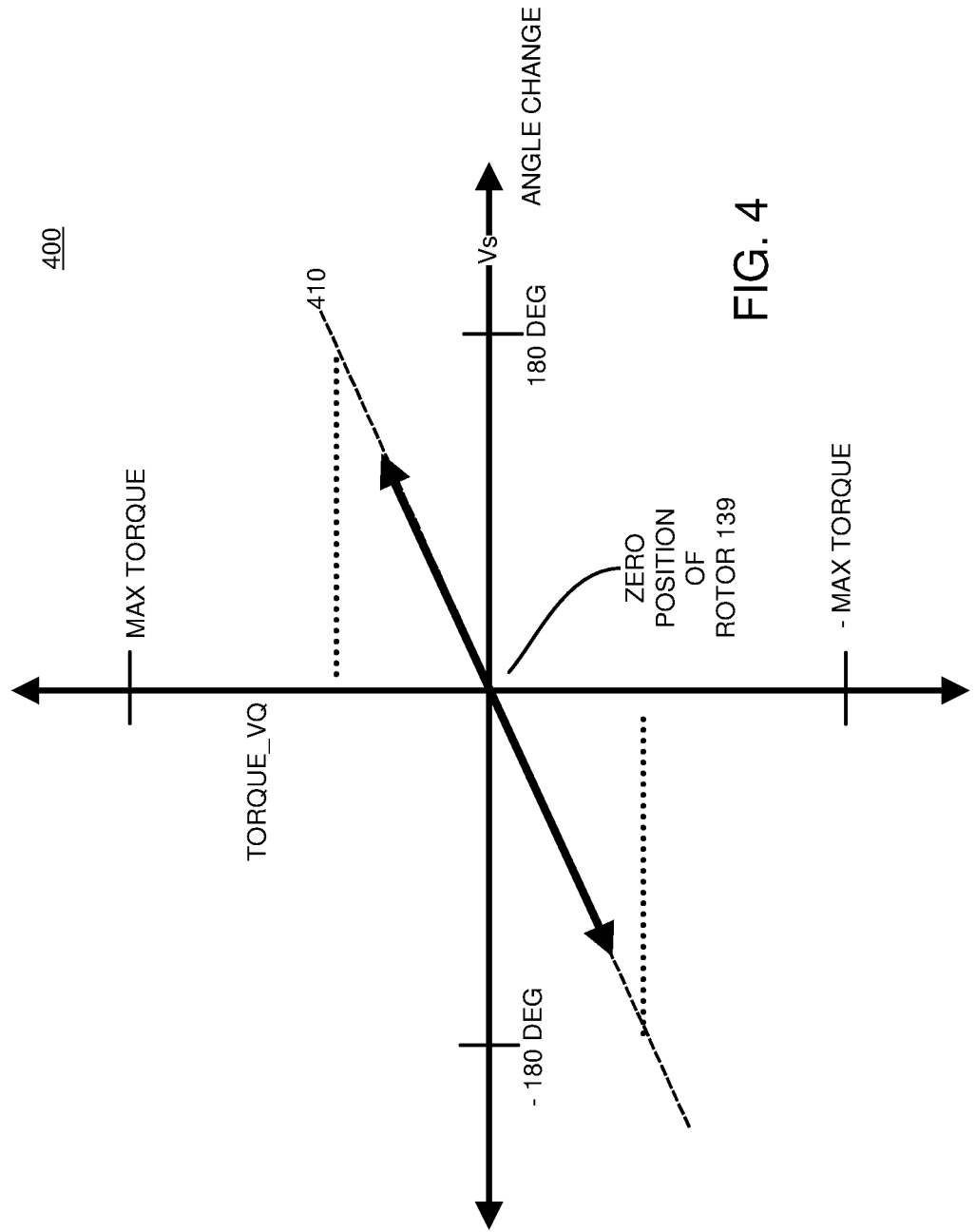
FIG. 4 is an example diagram illustrating an angle change versus torque curve to avoid oscillations in a rotor position as discussed herein.

FIG. 4 is an example diagram illustrating an angle change versus torque curve to avoid oscillation as discussed herein.

In one example, when controlling the rotor 139 with respect to the zero reference position, the controller 140 as discussed herein can be configured to avoid or reduce unwanted oscillation of the shaft 139 via implementation of the linear control function 410 as shown in graph 400. In general, it is noted that the reduced or mild slope of the angle change Vs versus torque Vq in linear control function 410 provides application of braking torque to the rotor 139. However, implementation of the linear control function 410 by the control function 142 results in achieved braking torque that is less than a defined maximum torque. Thus, the linear control function 410 in FIG. 4 does not provide optimal torque for the different possible position settings of the rotor 139. As an alternative to the linear control function 410, techniques herein include implementing the piecewise angle-to-torque converter function 610.

Figure 5:
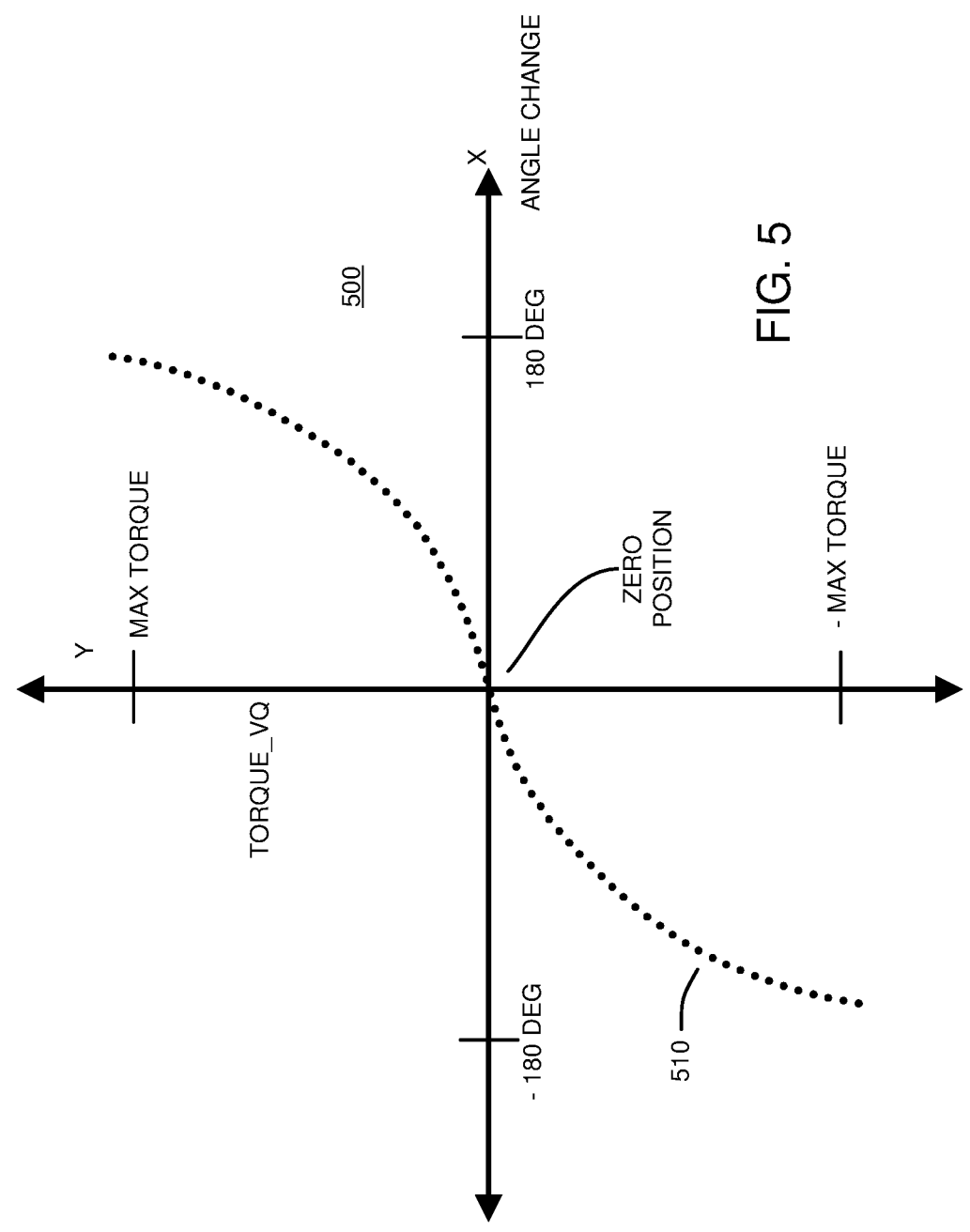
FIG. 5 is an example diagram illustrating an ideal nonlinear angle-to-torque function for applying a braking torque versus angle as discussed herein.

FIG. 5 is an example diagram illustrating an ideal function for applying a braking torque versus angle as discussed herein.

In this example, the controller 140 (such as the control function 142 such as implementing a zero speed braking algorithm) and corresponding components as previously discussed can be configured to implement the nonlinear control function 510 as shown in graph 500 to maintain a respective angle of the rotor such as at a rest position in which the motor rotor 139 is not rotating but is instead kept at a fixed position with respect to the 0 reference position 325. It is noted that the control function 510 is complex and requires an abundance of memory if implemented via a respective lookup table.

As further discussed below and in the subsequent drawings, examples herein include implementing a piecewise function derived from multiple linear functions to convert a respective current angle of or error angle associated with the rotor 139 to a torque value that is then applied to the rotor 139 to reduce unwanted rotor motion oscillations. In other words, implementation of the piecewise control function as discussed herein biases the position of the rotor 139 toward a reference zero position 325 when an outside force is applied to the rotor 139 as shown in FIG. 12.

Figure 12:
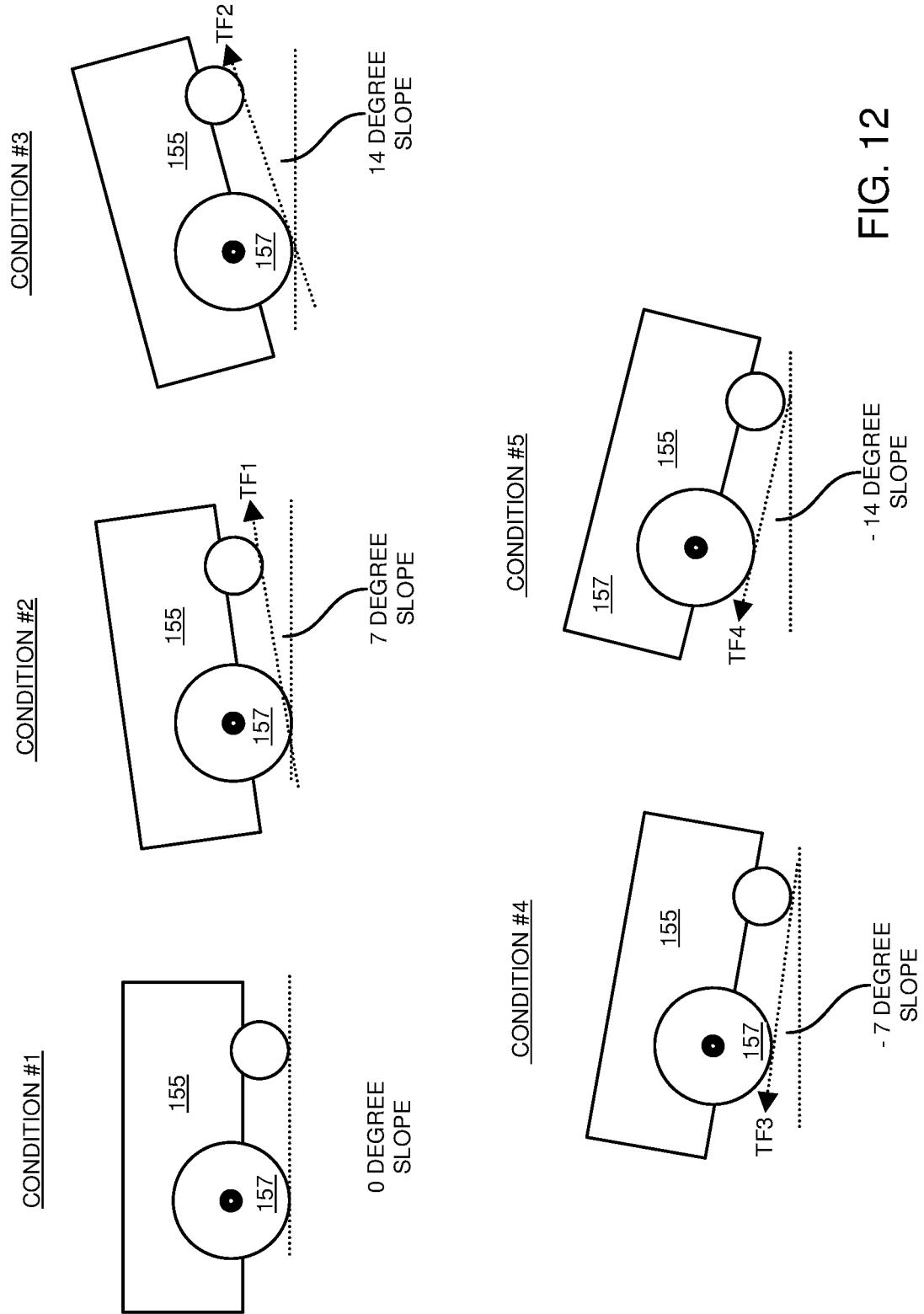
FIG. 12 is an example diagram illustrating different conditions of a vehicle and corresponding external torque applied to a rotor as discussed herein.

More specifically, as shown in FIG. 12, the rotor 139 of the motor 130 can be configured to control rotation of the wheel 157 disposed on the vehicle 155. In other words, there is a direct linkage between the rotor 139 of the motor 130 and the corresponding wheel 157. Rotation of the rotor 139 results in rotation of the wheel 157.

When on a flat surface as shown in condition #1, there is no outside torque applied to the wheel 157.

However, in condition #2, the vehicle 155 resides on a 7 degree slope. This results in a torque TF1 applied to the wheel 157 and corresponding rotor 139. The apply torque TF1 that causes angular rotation of the wheel 157 with respect to a desired 0 reference position. As further discussed herein, the controller 140 and corresponding components implement the piecewise angle-to-torque converter function 610 to apply a torque in an opposite direction of the torque TF1. This applied torque to maintain the angular position of the wheel 157 closer to the 0 reference position 325.

In condition #3, the vehicle 155 resides on a 14 degree slope. This results in a torque TF2 (torque TF2 greater than torque TF1) applied to the wheel 157 and corresponding rotor 139. The applied torque TF2 causes angular rotation of the wheel 157 with respect to a desired reference position. As further discussed herein, the controller 140 and corresponding components implement the piecewise angle-to-torque converter function 610 to apply the corresponding supplemental torque as indicated by signal Vq in an opposite direction of the torque TF2.

Thus, when the vehicle 155 is present on an incline, the weight of the vehicle 155 results in an outside force applied to the wheel 157 and corresponding rotor 139, causing the wheel 157 of the rotor 139 to rotate off of the 0 reference position 325. The application of the torque to the rotor 139 counteracts the outside force, preventing the rotor 139 from rotating too far from the 0 reference position 325.

In condition #4, the vehicle 155 resides on a –7 degree slope. This results in a torque TF3 applied to the wheel 157 and corresponding rotor 139. The apply torque TF3 that causes angular rotation of the wheel 157 with respect to a desired 0 reference position. As further discussed herein, the controller 140 and corresponding components implement the piecewise angle-to-torque converter function 610 to apply a torque in an opposite direction of the torque TF3. This applied torque to maintain the angular position of the wheel 157 closer to the 0 reference position 325.

In condition #5, the vehicle 155 resides on a –14 degree slope. This results in a torque TF5 (torque TF5 greater than torque TF4) applied to the wheel 157 and corresponding rotor 139. The applied torque TF4 causes angular rotation of the wheel 157 with respect to a desired reference position. As further discussed herein, the controller 140 and corresponding components implement the piecewise angle-to-torque converter function 610 to apply the corresponding supplemental torque as indicated by signal Vq in an opposite direction of the torque TF4.

Thus, when the vehicle 155 is present on a decline, the weight of the vehicle 155 results in an outside force applied to the wheel 157 and corresponding rotor 139, causing the wheel 157 of the rotor 139 to rotate off of the 0 reference position 325. The application of the torque to the rotor 139 counteracts the outside force, preventing the rotor 139 from rotating too far from the 0 reference position 325.

Figure 6:
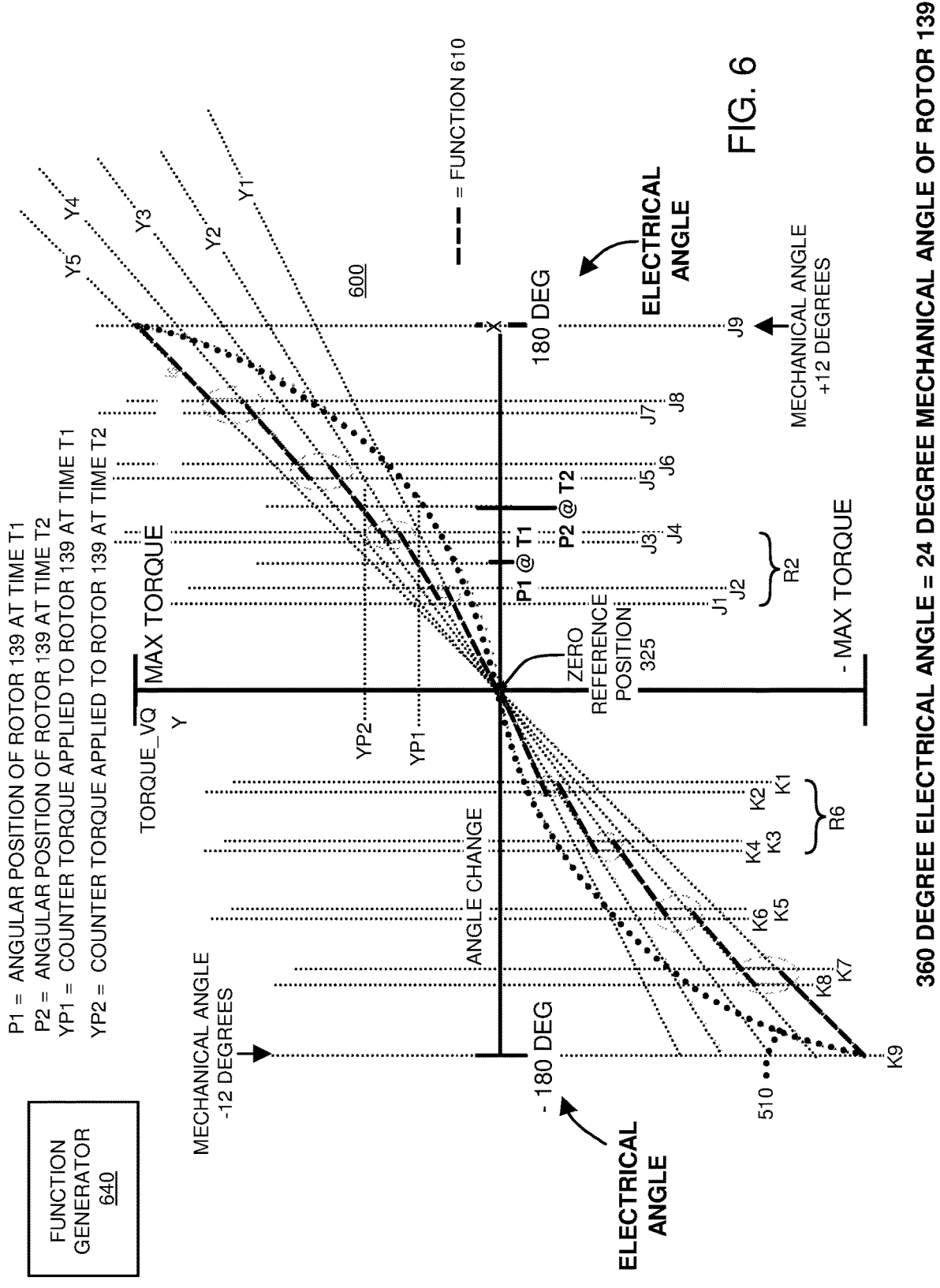
FIG. 6 is an example diagram illustrating a piecewise angle-to-torque converter function derived from stringing together portions of multiple angle-to-torque converter functions as discussed herein.

FIG. 6 is an example diagram illustrating a piecewise angle-to-torque converter function derived from stringing together multiple angle-to-torque converter functions as discussed herein.

In this example, the function generator 640 receives the ideal angle-to-torque converter function 510, which is difficult to implement for reasons as previously discussed. The function generator 640 converts the ideal nonlinear angleto-torque converter function 510 (a.k.a., master angle-to-torque converter function) into a more simplified angle-to-torque converter function 610 implemented by the controller 140 and corresponding control function 142 to apply any extra needed to torque to the rotor 139 via flow of current through one or more of the windings of the motor 130.

For example, conversion of the ideal nonlinear angle-to-torque converter function 510 may include receiving and/or generating multiple angle-to-torque converter functions Y1, Y2, Y3, Y4, and Y5 such as:

Y1(X)=M1×X, where M1 is a slope of the function Y1, where Y1 represents a torque value on the Y-axis for a given angle X (such as error angle or current position of the rotor 139 with respect to the zero reference position 325);

Y2(X)=M2×X, where M2 is a slope of the function Y2, where Y2 represents a torque value on the Y-axis for a given angle X (such as error angle or current position of the rotor 139 with respect to the zero reference position 325);

Y3(X)=M3×X, where M3 is a slope of the function Y3, where Y3 represents a torque value on the Y-axis for a given angle X (such as error angle or current position of the rotor 139 with respect to the zero reference position 325);

Y4(X)=M4×X, where M4 is a slope of the function Y4, where Y4 represents a torque value on the Y-axis for a given angle X (such as error angle or current position of the rotor 139 with respect to the zero reference position 325);

Y5(X)=M5×X, where M5 is a slope of the function Y5, where Y5 represents a torque value on the Y-axis for a given angle X (such as error angle or current position of the rotor 139 with respect to the zero reference position 325).

As further shown, the function generator 640 (such as human, machine, etc.) selects portions of the multiple angle-to-torque converter functions (Y1, Y2, Y3, Y4, etc.) to produce a piecewise angle-to-torque converter function 610 that closely approximates the ideal nonlinear angle-to-torque converter function 510 for each of the different ranges of possible position angles X on the X axis.

For example, the function generator 640 determines that the angle-to-torque converter function Y1 fairly approximates the ideal nonlinear angle-to-torque converter function 510 in a first range R1 between the angle K2 and the angle J2. In such an instance, the function generator 640 selects the angle-to-torque function Y1 for error angles in the first range R1 between error angle K2 and error angle J2.

The function generator 640 determines that the angle-to-torque converter function Y2 fairly approximates the ideal nonlinear angle-to-torque converter function 510 in a second range R2 between the angle J1 and the angle J4. In such an instance, the function generator 640 selects the angle-to-torque function Y2 for error angles in the second range R2 between error angle J1 and error angle J4.

The function generator 640 determines that the angle-to-torque converter function Y3 fairly approximates the ideal nonlinear angle-to-torque converter function 510 in a third range between the angle J3 and the angle J6. In such an instance, the function generator 640 selects the angle-to-torque function Y3 for error angles in the third range between error angle J3 and error angle J6.

The function generator 640 determines that the angle-to-torque converter function Y4 fairly approximates the ideal nonlinear angle-to-torque converter function 510 in a fourth range between the angle J5 and the angle J8. In such an instance, the function generator 640 selects the angle-to-torque function Y4 for error angles in the fourth range between error angle J5 and error angle J8.

The function generator 640 determines that the angle-to-torque converter function Y5 fairly approximates the ideal nonlinear angle-to-torque converter function 510 in a fifth range between the angle J7 and the angle J9. In such an instance, the function generator 640 selects the angle-to-torque function Y5 for error angles in the fifth range between error angle J7 and error angle J9.

The function generator 640 determines that the angle-to-torque converter function Y2 fairly approximates the ideal nonlinear angle-to-torque converter function 510 in a sixth range between the angle K1 and the angle K4. In such an instance, the function generator 640 selects the angle-to-torque function Y2 for error angles in the sixth range between error angle K1 and error angle K4.

The function generator 640 determines that the angle-to-torque converter function Y3 fairly approximates the ideal nonlinear angle-to-torque converter function 510 in a seventh range between the angle K3 and the angle K6. In such an instance, the function generator 640 selects the angle-to-torque function Y3 for error angles in the seventh range between error angle K3 and error angle K6.

The function generator 640 determines that the angle-to-torque converter function Y4 fairly approximates the ideal nonlinear angle-to-torque converter function 510 in an eighth range between the angle K5 and the angle K8. In such an instance, the function generator 640 selects the angle-to-torque function Y4 for error angles in the eighth range between error angle K5 and error angle K8.

The function generator 640 determines that the angle-to-torque converter function Y5 fairly approximates the ideal nonlinear angle-to-torque converter function 510 in a ninth range between the angle K7 and the angle K9. In such an instance, the function generator 640 selects the angle-to-torque function Y5 for error angles in the ninth range between error angle K7 and error angle K9.

Accordingly, the function generator 610 derives the piecewise angle-to-torque converter function 610 based on the selected portions of the multiple angle-to-torque converter functions Y1, Y2, Y3, Y4, and Y5 for each of the different ranges. In one example, each of the multiple angle-to-torque converter functions Y1, Y2, Y3, Y4, and Y5 is a linear function of angle versus torque providing a conversion of angle-to-torque. The piecewise angle-to-torque converter function 610 approximates the nonlinear master angle-to-torque converter function (510). In other words, a piecewise combination of the multiple angle-to-torque converter functions Y1, Y2, Y3, Y4, and Y5 represents a nonlinear angle-to-torque converter function 610 over a range of possible values for the current angular position of the rotor 139.

The selected portions of the multiple angle-to-torque converter functions used by the function generator 640 to produce the piecewise angle-to-torque converter function 610 include: a first portion such as a selected portion (between angle K2 and angle J2) of the function Y1 assigned to the first range R1, a second portion such as a selected portion (between angle J1 and angle J4) of the function Y2 assigned to the second range R2, a third portion such as a selected portion (between angle J3 and J6) of the function Y3 assigned to the third range R3, a fourth portion such as a selected portion (between angle J5 and J8) of the function Y4 assigned to the fourth range R4, a fifth portion such as a selected portion (between angle J7 and J9) of the function Y5 assigned to the fifth range R5, a sixth portion such as a selected portion (between angle K1 and angle K4) of the function Y2 assigned to the sixth range R6, a seventh portion such as a selected portion (between angle K3 and K6) of the function Y3 assigned to the seventh range R7, any portion such as a selected portion (between angle K5 and K8) of the function Y4 assigned to the eighth range R8, a ninth portion such as a selected portion (between angle J7 and J9) of the function Y5 assigned to the ninth range R9.

As shown in FIG. 6 and corresponding graph 600, as well as shown in FIG. 7, the different ranges of selected portions of functions can be configured to overlap each other to support hysteresis. For example, the second range (between angle J1 and angle J4) overlaps with the first range (between angle K2 and angle J2 by the amount between angle J1 and angle J2; the third range (between angle J3 and angle J6) overlaps with the second range (between angle J1 and angle J4) by the amount between angle J3 and angle J4; . . . , the sixth range (between angle K1 and angle K4) overlaps with the first range (between angle K2 and angle J2) by the amount between angle K1 and angle K2; the seventh range (between angle K3 and angle K6) overlaps with the eighth range (between angle K5 and angle K8) by the amount between angle K5 and angle K6; and so on.

Referring again to FIG. 2 and FIG. 3 and FIG. 6 and FIG. 7, the controller 140 implements the piecewise angle-to-torque converter function 610 to apply a bias torque to the rotor 139, biasing the position of the rotor 139 towards the 0 reference angle 325. Thus, when the rotor 139 is at a standstill, the controller 140 applies the bias torque to the rotor 139 such that the error angle is reduced.

As a more specific example, as previously discussed, the angle sensor 215 monitors a corresponding angular position of the rotor 139 and stores the angular position of the rotor 139 at a time of terminating rotation of the rotor 139 as a 0 angle reference value 325. In other words, in one example, the reference angular position 325 of the rotor 139 is a zero reference angular position of the rotor 139 at a time of the motor controller 140 executing a command to transition from rotation of the rotor to non-rotation of the rotor.

Additionally, note that the angle processing resource 141 receives constantly updated angle information 228 from the angle sensor 215. The angle information 228 is constantly updated and indicates the current position (i.e., mechanical angular orientation) of the rotor 139. The angle processing resource 141 converts the signal 228 into the rotor position signal 229 indicating the current position of the rotor 139.

The controller 142 can be configured to generates a respective angle error value indicating a difference between a current angular position (as indicated by the angle information 229) of the rotor 139 with respect to a reference angular position of the rotor (0 angle reference value 325).

Based on the magnitude of the angle error value, the controller 142 selects an angle-to-torque converter function associated with the piecewise angle-to-torque converter function 610.

More specifically, as shown in FIG. 6, assume that the angle error value is equal to 0 during a respective condition #1 as shown in FIG. 12. In such an instance, the controller 140 does not apply any torque (the Vq is set to 0) to the rotor 139.

During condition #2 shown in FIG. 12, the control function 142 receives input indicating that the rotor 139 resides at position P1 at time T1. In such an instance, via the range information in FIG. 7, the controller 142 detects that the magnitude of the angle error value for the position P1 of the rotor 139 falls within range #2 (between angle J1 and angle J4). Recall that the range #2 of the piecewise angle-to-torque converter function 610 is assigned the angle-to-torque converter function Y2. The controller 142 therefore selects the angle-to-torque converter function Y2 to determine the appropriate torque Vq for the angle P1.

Via the angle-to-torque converter function Y2, the controller 142 derives a torque value indicating a magnitude of torque to apply to the rotor for the angular position P1 at time T1. The torque value is determined as follows:

$$Y2(P1)=M2*P1.$$

Accordingly, the motor controller 142 is operative to select the angle-to-torque converter function Y2 from amongst the multiple angle-to-torque converter functions associated with the piecewise function 610 based on a magnitude of the error value or current angle of the rotor 139 as indicated by the rotor position signal 229 with respect to the 0 reference position 325. The motor controller 142 then applies a magnitude of torque Vq=Y2(P1) to the rotor 139 as indicated by the torque value M2*P1 equal to YP1. Note that this torque is applied in an angular direction to counteract an outside force (torque TF1 as a result of being on an incline) applied to the rotor 139 to reduce a magnitude of the difference between the current angular position P1 of the rotor and the reference zero reference angular position.

Further in this example, via control of the motor 130 by the controller 140, assume that the vehicle 155 moves to a new location and is stopped as shown in condition #3 in FIG. 12. In such an instance, the control function 142 receives a second error value indicating a difference between the current angular position (position P2 at time T2) of the rotor with respect to a second reference angular position (such as new 0 reference position 325) of the rotor 139 at a second instant of time T2. Based on a magnitude of the second error value or angular position P2 at time T2, the control function 142 determines that the value P2 resides within the range R3.

In other words, the control function 142 selects the second angle-to-torque converter function Y3 amongst the multiple angle-to-torque converter functions associated with the piecewise function 610 in response to detecting that the magnitude of the second error value or angular position P2 at the second instant of time falls within a second range R3 assigned to the second angle-to-torque converter function Y3.

Via the range information in FIG. 7, the control function 142 selects the angle-to-torque converter function Y3 amongst the multiple angle-to-torque converter functions assigned to the range R3 in which the value P2 resides. Via the second angle-to-torque converter function Y3, the control function 142 derives a second torque value indicating a magnitude of torque [Y3(P2)=M3×P2=YP2] to apply to the rotor 139. In other words, in this example, the magnitude of the signal Vq is YP2. The control function 142 and corresponding circuitry then apply a magnitude of torque YP2 to the rotor 139. As previously discussed, the torque YP2 is applied in an angular direction (such as clockwise to the wheel 157) to reduce a magnitude of the difference between the current angular position of the rotor 139 at the second instant in time and the zero reference angular position associated with condition #3.

Again, as previously discussed, implementation of the piecewise function 610 reduces or prevents angular rotation oscillations of the rotor 139 at the standstill position.

Figure 8:
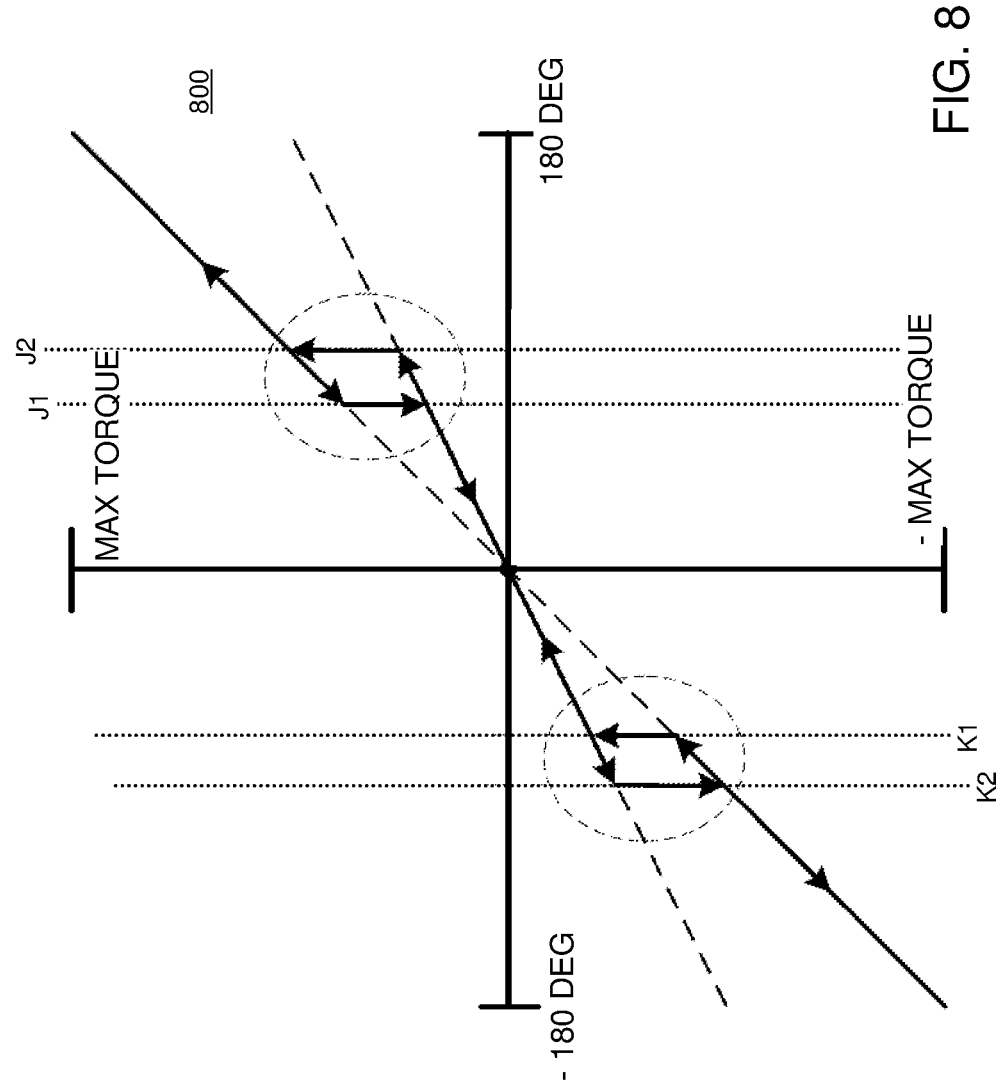
FIG. 8 is an example diagram illustrating implementation of hysteresis as discussed herein.

FIG. 8 is an example diagram illustrating implementation of hysteresis when switching from one range to another as discussed herein.

For example, the control function 142 can be configured to initially apply the angle to torque converter function Y1 during conditions in which the corresponding angular position of the rotor 139 resides within the range between K2 and J2. However, in accordance with hysteresis provided by overlapping of the ranges as discussed herein, the control function 142 does not switch over to use of the range R2 or range R6 until the magnitude of the angular position 229 is greater than angle J2 or less than angle K2. In order to switch back to using the range R1, the controller function 142 needs to detect the magnitude of the angular position of the rotor 139 being within the range K1 and J1.

Figure 9:
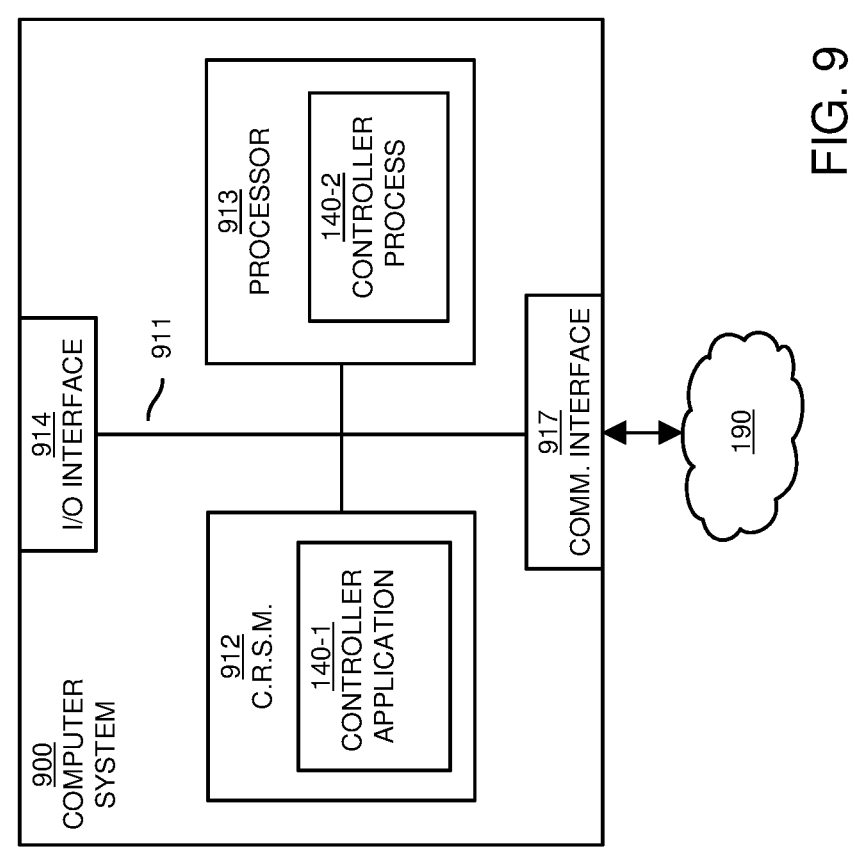
FIG. 9 is an example diagram illustrating computer processor hardware and related software instructions that may be used to execute methods according to examples herein.

FIG. 9 is an example block diagram of a computer device for implementing any of the operations as discussed herein according to examples herein.

As shown, computer system 900 (such as implemented by any of one or more resources such as function generator 640, controller 140, control function 142, angle processing resource 141, current monitor 150, angle sensor 215, etc.) of the present example includes an interconnect 911 that couples computer readable storage media 912 such as a non-transitory type of media (or hardware storage media) in which digital information can be stored and retrieved, a processor 913 (e.g., computer processor hardware such as one or more processor devices), I/O interface 914, and a communications interface 917.

I/O interface 914 provides connectivity to any suitable circuitry or component such as user interface 115, current monitor 150, inverter 210, etc.

Computer readable storage medium 912 can be any hardware storage resource or device such as memory, optical storage, hard drive, floppy disk, etc. In one example, the computer readable storage medium 912 stores instructions and/or data used by the controller application 140-1 to perform any of the operations as described herein.

Further in this example, communications interface 917 enables the computer system 900 and processor 913 to communicate over a resource such as network 190 to retrieve information from remote sources and communicate with other computers.

As shown, computer readable storage media 912 is encoded with controller application 140-1 (e.g., software, firmware, etc.) executed by processor 913. Controller application 140-1 can be configured to include instructions to implement any of the operations as discussed herein.

During operation of one example, processor 913 accesses computer readable storage media 912 via the use of interconnect 911 in order to launch, run, execute, interpret or otherwise perform the instructions in controller application 140-1 stored on computer readable storage medium 912.

Execution of the controller application 140-1 produces processing functionality such as controller process 140-2 in processor 913. In other words, the controller process 140-2 associated with processor 913 represents one or more aspects of executing controller application 140-1 within or upon the processor 913 in the computer system 900.

In accordance with different examples, note that computer system 900 can be a micro-controller device, logic, hardware processor, hybrid analog/digital circuitry, etc., configured to control a power supply and perform any of the operations as described herein.

Functionality supported by the different resources will now be discussed via flowchart 1000 in FIG. 10 and the flowchart 1100 FIG. 11. Note that the steps in the flowcharts below can be executed in any suitable order.

FIG. 10 is an example diagram illustrating a method of controlling a power converter according to examples herein.

In processing operation 1010 in the flowchart 1000, the controller 140 receives an error value or position signal 229 indicating a difference between a current angular position of a rotor 139 in a motor 130 with respect to a reference angular position of the rotor (zero angle reference position 325).

In processing operation 1020, depending upon a magnitude of the error value of the current angular position of the rotor 139, the controller 140 selects a first angle-to-torque converter function amongst multiple angle-to-torque converter functions (such as associated with the piecewise function 610).

In processing operation 1030, via the selected first angle-to-torque converter function associated with the piecewise function 610, the controller 140 derives a torque value Vq indicating a magnitude of torque to apply to the rotor. The controller 140 applies the torque as specified by the torque value to the rotor 139 to bias the corresponding rotor 139 towards the zero angle reference position. Thus, when an outside force is applied to the rotor 139 during a stop condition, such as because of the vehicle 155 being stopped on a hill, application of the torque as specified by the torque value biases the rotor 139 toward the zero angle reference position 325.

Figure 11:
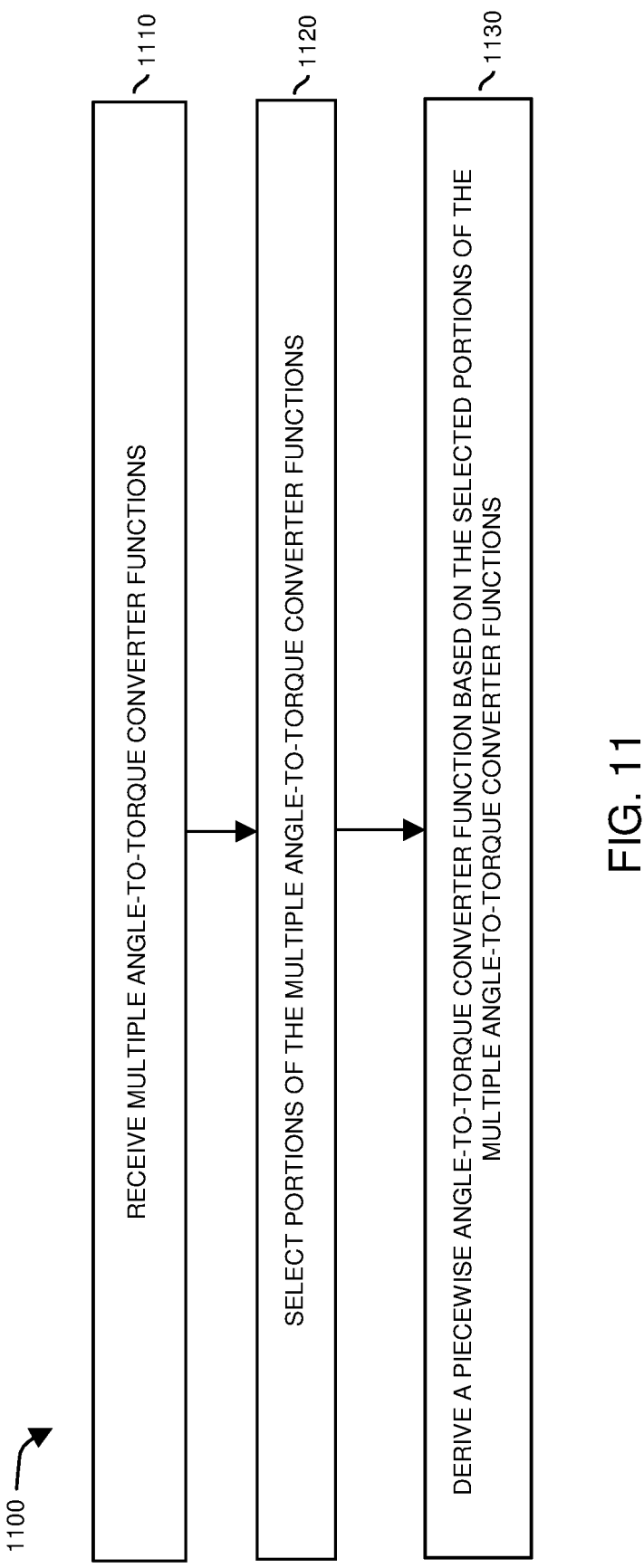
FIG. 11 is an example diagram illustrating generation of a piecewise angle-to-torque converter function as discussed herein.

FIG. 11 is an example diagram illustrating a method of controlling a power converter according to examples herein.

In processing operation 1110 in the flowchart 1100, the function generator 640 receives and/or generates multiple angle-to-torque converter functions Y1, Y2, Y3, Y4, and Y5.

In processing operation 1120, the function generator 640 selects portions of the multiple angle-to-torque converter functions that approximate the ideal angle-to-torque converter function 510.

In processing operation 1130, the function generator 640 derives a piecewise angle-to-torque converter function 610 based on the selected portions of the multiple angle-to-torque converter functions Note again that techniques herein are well suited for use in biasing a respective rotor to a zero angle reference position associated with the motor. However, it should be noted that examples herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a reference result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred examples thereof, it will be understood by those skilled in the art that various changes in form and details may be made therein without departing from the spirit and scope of the present application as defined by the appended claims. Such variations are intended to be covered by the scope of this present application. As such, the foregoing description of examples of the present application is not intended to be limiting. Rather, any limitations to the invention are presented in the following claims.

The invention claimed is:

1. An apparatus comprising:
a motor controller operative to:
    produce an error value indicating a difference between a current angular position of a rotor in a motor with respect to a reference angular position of the rotor;
    based on the error value, select a first angle-to-torque converter function amongst multiple angle-to-torque converter functions;
    via the first angle-to-torque converter function, derive a torque value indicating a magnitude of torque to apply to the rotor; and
    via control of current through multiple windings of the motor, apply the magnitude of torque to the rotor as indicated by the torque value.

2. The apparatus as in claim 1, wherein the motor controller is operative to select the first angle-to-torque converter function from amongst the multiple angle-to-torque converter functions based on a magnitude of the error value.

3. The apparatus as in claim 1, wherein the torque is applied in an angular direction to reduce a magnitude of the difference between the current angular position of the rotor and the reference angular position.

4. The apparatus as in claim 1, wherein the reference angular position is a zero reference angular position of the rotor at a time of the motor controller executing a command to transition from rotation of the rotor to non-rotation of the rotor.

5. The apparatus as in claim 1, wherein each of the multiple angle-to-torque converter functions is a linear function of angle versus torque providing a conversion of angle-to-torque.

6. The apparatus as in claim 1, wherein the multiple angle-to-torque converter functions is a piecewise angle-to-torque converter function, the piecewise angle-to-torque converter function including the first angle-to-torque converter function and a second angle-to-torque converter function.

7. The apparatus as in claim 6, wherein the first angle-to-torque converter function is assigned a first angular range;
wherein the second angle-to-torque converter function is assigned a second angular range; and
wherein the first angular range overlaps with respect to the second angular range to provide hysteresis.

8. The apparatus as in claim 1, wherein the error value is a first error value obtained at a first instant of time;
wherein the torque value is a first torque value;
wherein the reference angular position is a first reference angular position; and
wherein the motor controller is further operative to: select the first angle-to-torque converter function amongst the multiple angle-to-torque converter functions in response to detecting that a magnitude of the first error value at the first instant of time falls within a first range assigned to the first angle-to-torque converter function.

9. The apparatus as in claim 8, wherein the motor controller is further operative to:
receive a second error value indicating a difference between the current angular position of the rotor with respect to a second reference angular position of the rotor at a second instant of time;
based on a magnitude of the second error value, select a second angle-to-torque converter function amongst the multiple angle-to-torque converter functions; and
via the second angle-to-torque converter function, derive a second torque value indicating a second magnitude of torque to apply to the rotor.

10. The apparatus as in claim 9, wherein the motor controller is further operative to:
select the second angle-to-torque converter function amongst the multiple angle-to-torque converter functions in response to detecting that a magnitude of the second error value at the second instant of time falls within a second range assigned to the second angle-to-torque converter function.

11. The apparatus as in claim 10, wherein the motor controller is further operative to:
apply a magnitude of torque to the rotor as indicated by the second torque value, the torque as indicated by the second torque value applied in an angular direction to reduce a magnitude of the difference between the current angular position of the rotor at the second instant of time and the second reference angular position.

12. A method comprising:
receiving a current angular position of a rotor in a motor with respect to a reference angular position of the rotor;
based on the current angular position, selecting a first angle-to-torque converter function amongst multiple angle-to-torque converter functions;
via the first angle-to-torque converter function, deriving a torque value indicating a magnitude of torque to apply to the rotor; and
controlling current through multiple windings of the motor to apply the magnitude of torque to the rotor as indicated by the torque value.

13. The method as in claim 12, wherein
the torque is applied in an angular direction to reduce a magnitude of a difference between the current angular position of the rotor and a reference angular position of the rotor.

14. The method as in claim 13, wherein the reference angular position is a zero reference angular position of the rotor at a time of the motor controller executing a command to transition from rotation of the motor to non-rotation of the rotor.

15. The method as in claim 12, wherein each of the multiple angle-to-torque converter functions is a linear function of angle versus torque providing a conversion of angle-to-torque.

16. The method as in claim 12, wherein a piecewise combination of the multiple angle-to-torque converter functions represents a nonlinear angle-to-torque converter function.

17. A method comprising:

producing multiple angle-to-torque converter functions;

selecting portions of the multiple angle-to-torque converter functions;

deriving a piecewise angle-to-torque converter function based on the selected portions of the multiple angle-to-torque converter functions; and implementing the piecewise angle-to-torque converter function to control rotation of a rotor of a motor.

18. The method as in claim 17, wherein the piecewise angle-to-torque converter function approximates a nonlinear angle-to-torque converter function.

19. The method as in claim 18, wherein each of the multiple angle-to-torque converter functions is a linear function.

20. The method as in claim 17, wherein the selected portions of the multiple angle-to-torque converter functions include:

a first portion, the first portion selected from a first angle-to-torque function of the multiple angle-to-torque functions; and a second portion, the second portion selected from a second angle-to-torque function of the multiple angle-to-torque functions.

21. The apparatus as in claim 1 further comprising:

multiple switches operative to control a magnitude of the current through the multiple windings of the motor; and wherein the motor controller is operative to: i) derive control settings from the torque value, and ii) apply the control settings to the multiple switches.

22. The apparatus as in claim 21, wherein the control of the current through the multiple windings of the motor via the application of the control settings to the multiple switches is operative to control the magnitude of the torque to the rotor as indicated by the torque value.

23. The apparatus as in claim 1 further comprising:

switch circuitry operative to receive control input from the motor controller, the control input derived by the motor controller from the torque value, the switch circuitry operative to control the current through the multiple windings of the motor based on the control input.

24. The method as in claim 12, wherein controlling the current through the multiple windings of the motor includes:

deriving current control settings from the torque value; and applying the current control settings to switches to control a magnitude of the current through the multiple windings of the motor, the application of the current control settings to the switches resulting in the application of the magnitude of the torque to the rotor as indicated by the torque value.

25. The method as in claim 12, wherein controlling the current through the multiple windings includes:

deriving current control settings from the torque value; and controlling a magnitude of the current through the multiple windings via the derived current control settings.

* * * * *